United States Patent
Bredberg (12)

(10) Patent No.: US 6,324,408 B1
(45) Date of Patent: Nov. 27, 2001

(54) POWER CONTROL IN SENSITIVE ENVIRONMENTS FOR PRIVATE WIRELESS SYSTEMS

(75) Inventor: Tony Bredberg, Raleigh, NC (US)

(73) Assignee: Ericsson Inc.

( * ) Notice: Subject to any disclaimer, the term of this patent is extended or adjusted under 35 U.S.C. 154(b) by 0 days.

(21) Appl. No.: 09/322,943

(22) Filed: May 28, 1999

(51) Int. Cl.[7] .............................. H04B 7/00; H04B 1/38; H04M 1/00
(52) U.S. Cl. ............................. 455/522; 455/553; 455/69
(58) Field of Search ........................... 455/69, 522, 67.1, 455/127, 552, 553, 426, 462, 465

(56) References Cited

U.S. PATENT DOCUMENTS

| | | |
|---|---|---|
| 4,918,431 | 4/1990 | Borras . |
| 5,761,622 | * 6/1998 | Priest ..................................... 455/69 |
| 5,983,100 | * 11/1999 | Johansson et al. .................. 455/67.1 |

FOREIGN PATENT DOCUMENTS

| | | |
|---|---|---|
| 0 830 046 A | 3/1998 | (EP) . |
| 0 843 421 A | 5/1998 | (EP) . |

OTHER PUBLICATIONS

Conventional Local Area Radio Coverage System, *Motorola Technical Developments*, US, Motorola Inc., vol. 13, Publication Date: Jul. 1, 1991.

* cited by examiner

*Primary Examiner*—Nguyen T. Vo
(74) *Attorney, Agent, or Firm*—Coats & Bennett, P.L.L.C.

(57) ABSTRACT

A power control is described in a mobile station adapted for use in both public and private wireless systems. The mobile station includes a transmitter for broadcasting radio signals to one of the wireless systems. A control is operatively associated with the transmitter for controlling mobile station transmit power to normally transmit at a relatively high power level when the mobile station is communicating in the public wireless system and at a relatively low power level when the mobile station is communicating in the private wireless system, responsive to commands received from the wireless system in which the mobile station is communicating. Programmable limits are operatively associated with the control for selectively controlling the mobile station to operate in a normal mode or safe mode, the safe mode limiting the mobile station to communicating at the relatively low power level in either wireless system.

20 Claims, 1 Drawing Sheet

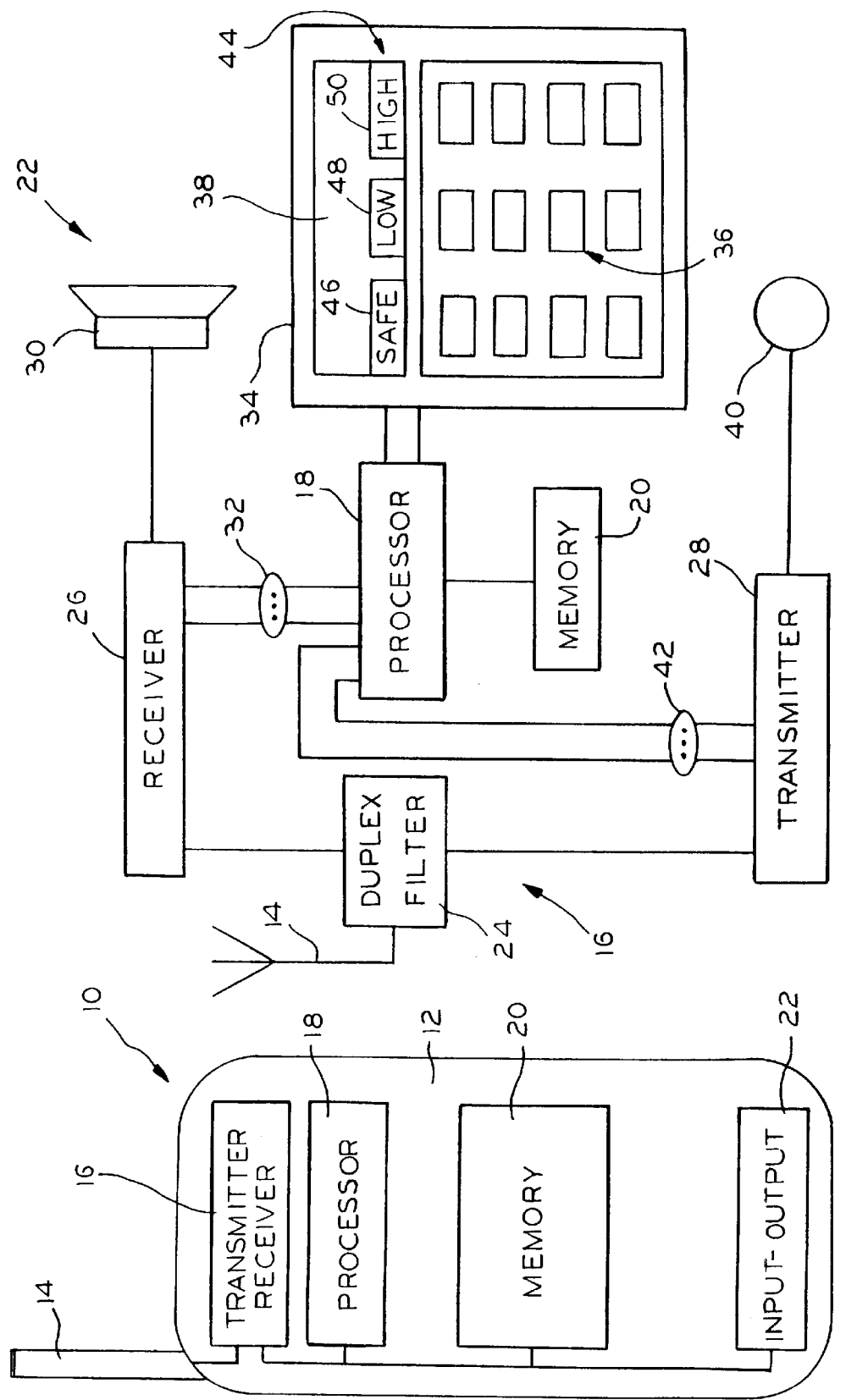

POWER CONTROL IN SENSITIVE ENVIRONMENTS FOR PRIVATE WIRELESS SYSTEMS

FIELD OF THE INVENTION

This invention relates to mobile stations for use in both public and private wireless systems and, more particularly, to a power level control in a mobile station.

BACKGROUND OF THE INVENTION

A wireless communication system, in the form of a cellular system, is designed to cover a large geographic area. The system is divided into numerous cells providing air interface between mobile stations and land-based systems, such as the public land mobile network (PLMN). Recently, cellular based system design is used as a foundation for smaller, private systems, such as wireless office systems (WOS). These private systems may share the spectrum with the public cellular systems. Being smaller in scale than a public cellular system, a private cellular system is intended to operate at lower power levels.

Mobile stations are conventionally designed to adjust mobile station power level to keep the mobile transmitting at a high enough power level to minimize bit errors in the uplink direction. The balancing objective is to keep the mobile transit power low enough to minimize interference to other systems, and to extend the battery life of the mobile. In the public cellular systems the power level is controlled by commands in a digital control channel (DCCH). In wireless office systems the power level is set in control message commands sent to the mobile station. In either case the appropriate power level is determined by the wireless system and the mobile station controls its transmitter responsive to such commands. The power level used for private wireless systems is substantially lower than that used for public wireless systems. In fact the transmit power level in public wireless systems may be on the order of 100 mWatts, while for a WOS on the order of 1 mWatt.

The lower power level used for private wireless systems is an appealing feature for environments such as hospitals where any type of traditional cellular communications is strictly banned. The reasons for the ban include possible interference with hospital equipment such as heart monitors due to the high power level emitted from traditional public cellular system mobile stations.

As long as a private wireless system is operating normally, the power level from a mobile station will stay at low power level for office use. However, if the private wireless system experiences problems, there are possible failure situations where the mobile system will operate in the public network, and thus at higher power level, even if located within the area of the private wireless system. This can cause problems in sensitive environments, such as a hospital. One solution to this problem is to manufacture a mobile station that can only be used at a low power level, such as for hospital environments. The power level is then limited to never reach above the power level allowed in a hospital environment. However, this requires that a special mobile station be manufactured just for hospital use, resulting in a higher manufacturing costs. Administration costs would increase due to handling of non-standard phones. Further, the mobile station could never be used in a PLMN environment. Finally, one of the main features of wireless office system phones is the ability to use the phone both in the PLMN and the private wireless office environment, which would be removed.

The present invention is directed to overcoming one or more of the problems discussed above in a novel and simple manner.

SUMMARY OF THE INVENTION

In accordance with the invention there is provided a power control for use in sensitive environments for private wireless systems.

Broadly, there is disclosed herein, a mobile station for use in wireless systems. The mobile station includes a transmitter for broadcasting radio signals to a wireless system in which the mobile station is communicating. A control is operatively associated with the transmitter for controlling mobile station transmit power in a normal mode or a safe mode, the normal mode transmitting at a select power level responsive to a command received from the wireless system. The safe mode includes programmable limit means for selectively limiting the mobile station to transmit at a relatively low power level in the wireless system.

More particularly, there is disclosed herein a mobile station adapted for use in both public and private wireless systems. The control includes a transmitter for broadcasting radio signals to one of the wireless systems. A control is operatively associated with the transmitter for controlling mobile station transmit power to normally transmit at a relatively high power level when the mobile station is communicating in the public wireless system and at a relatively low power level when the mobile station is communicating in the private wireless system, responsive to commands received from the wireless system in which the mobile station is communicating. Programmable limit means are operatively associated with the control for selectively controlling the mobile station to operate in a normal mode or safe mode, the safe mode limiting the mobile station to communicating at the relatively low power level in either wireless system.

It is a feature of the invention that the mobile station includes a keypad and the mode is selected by entering a passcode using the keypad. The programmable limit means compares the entered passcode to a mode passcode stored in a memory.

It is another feature of the invention that the mobile station includes a display for displaying an indication if the programmable limit means it is in the safe mode.

It is a further feature of the invention that the programmable limit means is programmable to permit the mobile station to communicate at the relatively high power level in the safe mode in response to a user entering a power level passcode. The mobile station includes a keypad and the power level passcode is entered using the keypad. The programmable limit means compares the entered power level passcode to a power passcode stored in a memory. The mobile station includes a display for displaying an indication that the mobile station is communicating at the relatively high power level in the safe mode.

In accordance with one aspect of the invention, the programmable limit means is programmed to prevent communicating at the relatively high power level if the mobile station is communicating in the private wireless system.

In accordance with another aspect of the invention, the programmable limit means is programmed to automatically return to communicating at the limited relatively low power level if the mobile station enters the private wireless system while communicating at the relatively high power level.

It is disclosed in accordance with a further aspect of the invention the method of controlling power level in a mobile station adapted for use in plural wireless systems. The method comprises the steps of providing a transmitter for broadcasting radio signals to one of the wireless system; controlling the transmitter to normally transmit at a power level responsive to commands received from the one wireless system, the commands normally requiring the transmitter to transmit at a relatively high power level when the mobile station is communicating in public wireless systems and at a relatively low power level when the mobile station is communicating in private wireless systems; and selectively controlling the mobile station to operate in a normal mode or a safe mode, the safe mode limiting the mobile station to communicating at the relatively low power level in any of the wireless systems.

Further features and advantages of the invention will be readily apparent from the specification and from the drawing.

BRIEF DESCRIPTION OF THE DRAWINGS

FIG. 1 is a generalized illustration of a mobile station including a power level control in accordance with the invention illustrated in block diagram;

FIG. 2 is a detailed block diagram of the power level control of FIG. 1.

DETAILED DESCRIPTION OF THE INVENTION

Referring to FIG. 1, a typical mobile station (also called a wireless telephone, cellular telephone, or cell phone), is shown generally at 10. The mobile station 10 includes a housing 12 supporting an antenna 14. The antenna 14 is connected to a transmitter/receiver block 16 for sending and receiving radio signals between itself and a wireless system. The transmitter/receiver block 16 is in turn connected to a processor 18, a memory 20 and an input/output block 22. The processor 18 implements programs stored in the memory 20 for controlling operation of the mobile station 10. Operation is also controlled by commands received from the input/output block 22.

Referring to FIG. 2, the mobile station 10 is illustrated in greater detail in block diagram form. The transmitter/receiver block 16 comprises a duplex filter 24, a receiver 26, and a transmitter 28. The antenna 14 is connected to the duplex filter 24 which is in turn connected to the receiver 26 and the transmitter 28. The duplex filter 24 enables the receiver 26 and the transmitter 28 to receiver and broadcast, respectively, on the same antenna 14. As is conventional, the receiver 26 demodulates, demultiplexes and decodes radio signals into one or more channels. Such channels include a control channel and a traffic channel for speech or data. The speech or data are delivered to a speaker 30 (or other output device, such as a modem or fax connecter).

The receiver 26 delivers messages from the control channel to the processor 18 over control lines 32. The processor 18 controls and coordinates the functioning of the mobile station 10 responsive to messages on the control channel, using the programs and data stored in the memory 20, so that the mobile station 10 can operate within a wireless system. The processor 1 8 also controls the operation of the mobile station 10 responsive to a user interface 34. The user interface 34 includes a keypad 36 as an input device and a display 38 to display information for a user. Other devices are frequently in the user interface 34, such as lights and special purpose buttons.

A microphone 40, or other data input device, receives speech signal input and converts the input into analog electrical signals delivered to the transmitter 28. The transmitter 28 is controlled by the processor 18 over signal lines 42. The transmitter 28 converts the analog electrical signals into digital data, encodes the data with error detection correction information and multiplexes this data with control messages from the processor 18. The transmitter 28 modulates this combined data stream and broadcasts the result in radio signals to the wireless system through the duplex filter 24 and the antenna 14.

In accordance the invention, the mobile station 10 is adapted to operate in a public wireless or cellular system, such as the public land mobile network (PLMN) and in private wireless systems, such as a digital wireless office system (WOS). How the mobile station 10 communicates a in both systems is well known and is not itself a part of the present invention. Instead, the invention relates particularly to a control for limiting transmit power levels from the transmitter 28 in sensitive environments for private wireless systems.

As is conventional, the processor 18, as discussed above, receives messages on the control channel, of either the public wireless system or the private wireless system, via the receiver 26 indicating a desired transmit power level. Normally, the processor 18 controls the transmitter 28, in response to power level message commands, to transmit at a relatively high power level when the mobile station 10 is communicating in the public wireless system and at a relatively low power level when the mobile station is communicating in the private wireless system. For example, the power level in the public wireless system might be in the order of 100 mWatts, while the power level in the private wireless system may be on the order of 1 mWatt.

In accordance with the invention, the mobile station 10 is programmed to be used in private wireless systems for both a hospital-type environment and a regular office-type environment. Also, users in the traditional office environment as well as many users in the hospital environment are not affected by any new operational procedures.

The mobile station 10 is adapted to provide service for three types of users. The first is the normal office user who has access to both the PLMN and private wireless system environments. The second is hospital personnel who only need access to the private wireless system. The third is hospital personnel who require access to both the PLMN and private wireless systems. This group is referred to herein as VIP personnel.

While the application discusses use of the invention with respect to hospital environments, the invention is applicable to any sensitive environment where communicating at low power levels is necessary or desired.

The first group mentioned above is typical of a regular office-type environment. The second and third operate in a mode where the power level is limited in the private wireless system in accordance with the invention. The mobile station for such users are selected to operate in a "safe mode", in addition to the normal mode. In accordance with the invention, a combination of two password codes, or passcodes, manages these two modes of use. In this application, the passcodes are referred to as a "mode passcode" and "power passcode". Both codes are saved in non-volatile portions of the memory 20 to remain in effect in power off for low battery conditions.

The mode passcode is simply a switch to change between hospital mode and normal office mode for private wireless systems. This code is only used by system administration at a hospital or the like, or by the factory when delivering the phones to a user. This mode passcode is normally used only a single time when the phone is delivered to a hospital user in the second and third groups mentioned above.

The VIP personnel use the power passcode any time they need to use the mobile station 10 in the PLMN environment. The mobile station 10 transmits at the lower power level until the code is entered no matter the state of the private wireless system. As a protection, the mobile station 10 could prevent the code from taking affect if the mobile station 10 is located within the private wireless environment.

If the mobile station 10 is used within the PLMN environment and then moves into the private wireless system environment, the VIP personnel are advantageously instructed, such as with a message on the display 38, to switch the mobile station 10 to the low power level mode. Alternatively, in the event the code is forgotten the mobile station 10 could switch to the low power level mode automatically without entering in the code. In a normal system, the mobile system 10 already transmits at the low power when used in the private wireless system environment, but with the slight difference that it may send at high power for the PLMN environment automatically without entering any passcode.

The use of the two passcodes as described above provides numerous advantages. Normal private wireless system users ignore the codes completely. Instead, the mobile stations 10 are delivered in the normal mode without any passcode being given. Likewise, most hospital personnel do not need to worry about codes as the administrator enters the mode passcode for safe mode. For safety in hospital use, the mode passcode is used to activate safe mode defaulting to low power. This way, the mobile station 10 never switches to high power unless the power passcode is used. The system is flexible because the VIP personnel receive the power passcode for use in the PLMN environment. Since the mobile station is activated in safe mode it can be used in both environments. Costs are reduced because the mobile station 10 is manufactured the same regardless of the type of installation.

To insure proper use in hospital environments or the like, if the VIP personnel forgets, the private wireless system automatically switches the mobile station to the limited low power level as long as the system is operating properly. The use of passcodes prevents accidental switching from low power levels to high power levels. For future considerations, if a mobile station 10 is sold or the private wireless system is converted to a normal office mode, the mode passcode can be used to switch to normal use.

In addition to use in hospital environments, the mode passcode can be used for regular private wireless system installations to restrict users from accessing the PLMN environment.

Because the mobile station 10 does not require any changes in the private wireless system, the mobile station 10 may be used in virtually any private wireless system that utilizes standard mobile stations. Likewise, these features can be applied to all types of cellular phone standards for private wireless system that may be used in sensitive environments such as hospitals.

The use of a password code instead of a manual switch reduces the risk for abuse. Since the end-users are not aware of the mode passcode, they cannot switch the phone to a normal mode. Also, only the VIP personnel are aware of the power passcode. The mode indicator, described below, allows hospital personnel to verify that a mobile station is allowed in the hospital. Also, a snap on-type cover may be used that clearly indicates the phone is for hospital-type use. A VIP personnel user could switch the cover for longer trips when used outside of the hospital environment.

In accordance with the invention, the display 38 includes display symbols 44 for indicating mode of operation. These display indicators 44 include a safe mode indicator 46, a low power level indicator 48 and a high power indicator 50. When operating in the normal mode, all of the indicators would be off. When operating in the safe mode, the safe mode indicator 46 is illuminated or turned on. The VIP personnel user needs an additional indication to tell what power mode the phone is operating at. This allows the VIP user to see if the phone is activated for the high power, the indicator 50, used in the PLMN environment. When entering the power passcode, the mobile station 10 will toggle between the high and low power levels. The displays 48 and 50 allow the user to see if the correct code was entered. Also, if the mobile station 10 automatically enters into the low power mode when entering the private wireless system coverage area, the VIP personnel will be aware of the change. Some alert-type tone via the speaker 30 may also be used as the phone toggles between high and low power levels.

As is apparent, the indicators 44 could be other types of indicators such as LED indicators or the like. Likewise, for the power level, a single indicator could be used with the indicator, for example, on for low power and off for high power level.

As discussed above, the processor 18 operates in accordance with a program stored in the memory 20 for implementing the power level control in accordance with the invention. The programmed control procedures for the first and second user groups is straightforward. For the first user group the mobile station 10 works as normal for the traditional office-type environment. As the user moves from the office environment to the public environment, the mobile station is allowed to switch to the high power levels used in the PLMN environment. None of the indicators 44 are visible in this mode.

For the second user group, the mobile station 10 operates as normal except that it never reaches above a preset lower power level determined to be safe for a hospital or similar-type environment.

The VIP personnel, the third group, is the only end-user that must be aware of the indicators 44 and use of the power passcode. The following describes the sequence of operation implemented by the processor 18 for controlling power level for the VIP personnel.

If the VIP user enters the power-passcode when phone is in Low Power mode, and
   If the user is inside WOS coverage area
     Alert the user that change is not allowed
   Else
     Toggle to High Power (PLMN) mode
     Alert VIP user of successful change
     Change indicator to show High Power mode.
If the VIP user enters the power-passcode when phone is in High Power mode,
   Toggle phone to Lower Power Mode no matter if user is in the PLMN
   or WOS coverage area
   Alert VIP user of successful change
   Change Indicator to show Low Power mode
   (Phone will stay at low power until the code is entered even if the user enters the PLMN area)
If the VIP user enters PWS coverage area without entering any code and if the phone is in High Power mode, Automatically toggle phone to Low Power Mode
Alert VIP user of automatic change
Change Indicator to show Low Power mode
(Phone will stay at law power until the code is entered even if the user enters the PLMN area).

Likewise, the processor 18 is programmed to provide the following operation in failure situations:

If the VIP user enters WOS coverage area without entering any code and if the WOS is down for a short time, and
If at Low Power mode
   User cannot make calls since the system is down
Else
   Phone automatically toggles to Low Power mode as soon as the WOS system comes up.
If the VIP user enters WOS coverage area without entering any code and if the WOS is down for a long time, and
If at Low Power mode
   User cannot make calls since the system is down
Else
   Potential disturbance to hospital equipment is possible only if close to sensitive equipment.
If the WOS is down for a long time and calls cannot be made due to low power mode
   User ignores safety procedures and switch to high power mode
   Phone will switch to high power mode
      Potential disturbance to hospital equipment is possible only if close to sensitive equipment
   User switch to high power at a safe distance or outside the WOS coverage area
      Phone will switch to high power mode making calls possible.

The mobile station 10 operating in accordance with that discussed above reduces potential disturbance to hospital equipment. The VIP user is carefully instructed to always use the power passcode to switch to low power levels. Nevertheless, even if the VIP user forgets to enter the code, the mobile station 10 automatically switches to the low power mode upon entry into the private wireless system coverage area. A power level-type indicator displays the high power mode even if inside the private wireless system area warning the VIP user that the private wireless system may be down. An alert is sounded every time the phone toggles between high and low power levels. The absence of this alert signal can be used to warn the VIP user that something may be wrong. As an option for additional safety, the mobile station 10 could default to the low power mode at power up. This prevents high power when the VIP personnel forget to enter the code at the same time the private wireless system happens to be down due to a failure situation. The mobile station 10 in accordance with the invention reduces the risk of potential disturbance to equipment in sensitive-type environments such as hospitals. At the same time, it allows the same mobile station 10 to be manufactured for use both in hospital-type environments and regular private wireless system environments. Additionally, operational procedures for the end-users are kept to a minimum. A major portion of users are the regular office users, and most hospital personnel have no operational procedures to follow. Only a small fraction of hospital users, the VIP users, need a passcode to toggle their mobile station 10 between the PLMN and the hospital-type environment.

In the event air interface standards are adapted to accommodate a specific power class for environments where only very low transmitted RF power is acceptable, or provide a means to inform the fixed network that a power cap is being used, then the teachings of the present invention are still applicable. A mobile station locked onto the private wireless system, given by a Private System IDentity (a radio network identity allocated to a private wireless system, PSID in ANSI-136) with a power class/cap in effect, will not be allowed to exceed that power level when roaming without entering the power passcode. The power classcap will be used by the mobile stations cell selection and may in this case also be taken into consideration by the locating and handoff functions of the fixed network the mobile station is roaming in.

While the present invention is described in connection with private wireless systems, it may also be used with virtual private systems operated by the public wireless systems. The virtual private systems use a number of base stations in a private environment, such as a hospital, with its own unique PSID. The large number of base stations used allows for use of low power levels.

I claim:

1. A mobile station for use in wireless systems comprising:
   a transmitter for broadcasting radio signals to a wireless system in which the mobile station is communicating; and
   a control operatively associated with the transmitter for controlling mobile station transmit power in a normal mode or a safe mode, said normal mode limiting said transmitter to transmit at power levels responsive to power level commands received from the wireless system but not above a first maximum power level associated with said normal mode;
   said safe mode limiting said transmitter to transmit at power levels responsive to power level commands received from the wireless system, but not above a predetermined second maximum power level associated with said safe mode unless a power passcode is entered; and
   said control operative to enter said safe mode in response to entry of a mode passcode.

2. The mobile station of claim 1 wherein the mobile station comprises a keypad, said passcodes entered using said keypad.

3. The mobile station of claim 2 wherein the safe mode includes a programmable limit means, wherein the programmable limit means compares the entered passcode to a mode passcode stored in a memory.

4. The mobile station of claim 1 wherein the mobile station includes a display for displaying an indication if the control is in the safe mode.

5. A mobile station adapted for use in both public and private wireless systems, comprising:
   a transmitter for broadcasting radio signals to one of the wireless systems;
   a control operatively associated with the transmitter for controlling mobile station transmit power to normally transmit at a relatively high power level when the mobile station is communicating in the public wireless system and at a relatively low power level when the mobile station is communicating in the private wireless system, responsive to commands received from the wireless system in which the mobile station is communicating; and
   programmable limit means operatively associated with the control for selectively controlling the mobile station to operate in a normal mode or a safe mode, said normal mode limiting said transmitter to transmit at power levels responsive to power level commands received from the wireless system but not above a first maximum power level associated with said normal mode;

said safe mode limiting said transmitter to transmit at power levels responsive to power level commands received from the wireless system, but not above a predetermined second maximum power level associated with said safe mode unless a power passcode is entered; and said control operative to enter said safe mode in response to entry of a mode passcode.

6. The mobile station of claim 5 wherein the mobile station comprises a keypad, said passcodes entered using said keypad.

7. The mobile station of claim 5 wherein the mobile station includes a display for displaying an indication if the programmable limit means is in the safe mode.

8. The mobile station of claim 5 wherein the programmable limit means is programmable to permit the mobile station to communicate at the relatively high power level in the safe mode in response to a user entering the power level passcode.

9. The mobile station of claim 8 wherein the programmable limit means compares the entered power level passcode to a power passcode stored in a memory.

10. The mobile station of claim 8 wherein the mobile station includes a display for displaying an indication if the mobile station is communicating at the relatively high power level in the safe mode.

11. The mobile station of claim 8 wherein the programmable limit means is programmed to prevent communicating at the relatively high power level if the mobile station is communicating in the private wireless system.

12. The mobile station of claim 8 wherein the programmable limit means is programed to automatically return to communicating at the limited relatively low power level if the mobile station enters the private wireless system while communicating at the relatively high power level.

13. A method of controlling power level in a mobile station adapted for use in plural wireless systems, the method comprising the steps of:

providing a transmitter for broadcasting radio signals to one of the wireless systems;

controlling the transmitter to normally transmit at a power level responsive to commands received from the one wireless system, the commands normally requiring the transmitter to transmit at a relatively high power level when the mobile station is communicating in public wireless systems and at a relatively low power level when the mobile station is communicating in private wireless systems; and selectively controlling the mobile station to operate in a normal mode or a safe mode, said normal mode limiting said transmitter to transmit at power levels responsive to power level commands received from the wireless system but not above a first maximum power level associated with said normal mode;

said safe mode limiting said transmitter to transmit at power levels responsive to power level commands received from the wireless system, but not above a predetermined second maximum power level associated with said safe mode unless a power passcode is entered; and said control operative to enter said safe mode in response to entry of a mode passcode.

14. The method of claim 13 wherein the mobile station includes a keypad and the mode is selected by entering a passcode using the keypad.

15. The method of claim 14 wherein the controlling step comprises compaing the entered passcode to a mode passcode stored in a memory.

16. The method of claim 15 wherein the comparing step permits the mobile station to communicate the relatively high power level in the safe mode in response to a user entering a power level passcode.

17. The method of claim 16 wherein the mobile station includes a keypad and the power level passcode is entered using the keypad.

18. The method of claim 16 wherein the comparing step compares the entered power level passcode to a power passcode stored in a memory.

19. The method of claim 16 wherein the comparing step prevents communicating at the relatively high power level if the mobile station is communicating in the private wireless system.

20. The method of claim 16 wherein the comparing step automatically returns to communicating at the limited relatively low power level if the mobile station enters the private wireless system while communicating at the relatively high power level.

* * * * *